I. SHOWALTER.
Shovel.

No. 201,711. Patented March 26, 1878.

WITNESSES:
Francis Brown.
Thos. J. Grier

INVENTOR
Isaac Showalter,
by H. J. Fenton,
ATTORNEY

UNITED STATES PATENT OFFICE.

ISAAC SHOWALTER, OF WILLISTOWN TOWNSHIP, ASSIGNOR OF ONE-HALF HIS RIGHT TO WILLIAM M. JOHNSON, OF TREDYFFRIN, CHESTER COUNTY, PENNSYLVANIA.

IMPROVEMENT IN SHOVELS.

Specification forming part of Letters Patent No. 201,711, dated March 26, 1878; application filed February 16, 1878.

*To all whom it may concern:*

Be it known that I, ISAAC SHOWALTER, of Willistown township, Chester county, in the State of Pennsylvania, have invented a new and useful Improvement in Shovels; and I do hereby declare that the following is a full and exact description thereof, reference being had to the accompanying drawings, and to the letters of reference marked thereon, making a part of this specification.

The nature of my invention consists in so constructing a shovel that it shall possess greater strength and durability, and produce less friction on entering the ground or other material to be shoveled, than those heretofore in use.

To enable others skilled in the art or manufacture to which my invention belongs to make and use my improved shovel, I will proceed to describe its construction and operation.

Figure 1:
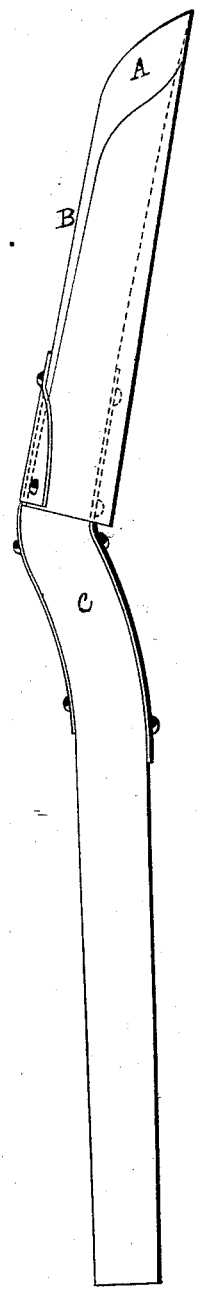
Figure 2:
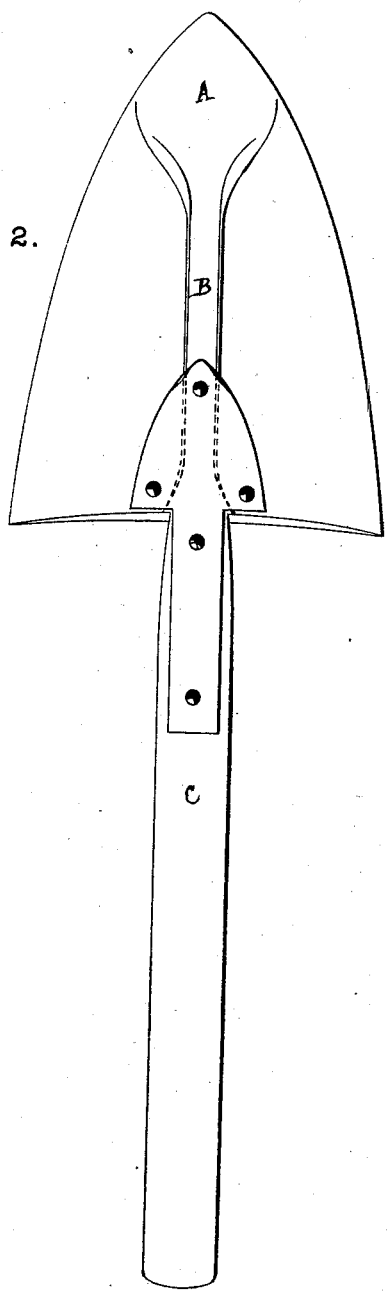

Figure 1 represents a side view of a shovel-blade constructed according to my improvement; Fig. 2, a rear view of the same.

Similar letters of reference indicate like parts in the several figures.

The scoop or blade of the shovel may be either bluntly pointed or rounded at the end which enters the ground, and it may be varied from a point, as shown in the drawings, to a full semicircle. At this end, and extending from the very edge to a distance of about one-fifth of the length of the blade, I attach the rounded knob A on the under side of the blade; and the rib B, of metal, which is a part or extension of the knob A, extends from it at or about the central part of the blade, on the under side thereof, to the upper end of the blade, where the handle C is attached.

The knob A is made of a thickness through varying from about a half-inch to two inches at its thickest part, depending upon the size of the blade or scoop; and it tapers unevenly, the shortest distance from the thickest part to the edge being the side toward the handle, and this edge of the knob may be in a straight line across the blade in the direction of its width, or it may be semicircular in form. The outer surface of the knob, on the side toward the edge of the blade, is of a slightly-tapering form, gradually decreasing in thickness toward the edge of the blade which enters the ground.

This shovel-blade may be constructed of the materials usually used for that purpose, such as sheet-iron, steel, &c.; and the knob or rounded edge A, with the rib B, may be made in one piece, and separately from the scoop or blade proper, and afterward riveted or otherwise permanently and securely attached thereto; or the thickened rounded edge or knob A at end of the scoop or blade and the rib B may be formed in one piece with and at the same time as the blade itself, by stamps or dies, out of a single piece of metal. This latter mode I deem preferable.

Ordinarily, shovels usually give way and break in the blade at two points, caused both by wear and strain—one near the end of the handle, and the other at a line in the width of the blade five or six inches from the edge which enters the ground. It will therefore be seen that a shovel constructed according to my improvement overcomes both these points of inferiority, and, in addition thereto, by reason of the tapering form of the knob or rounded edge, produces less friction in entering the ground or other material to be dug or shoveled.

Having thus described my invention, what I claim, and desire to secure by Letters Patent, is—

A shovel having a blade or scoop provided with a knob or rounded edge, A, on its under side, constructed substantially as described, and a rib, B, extending therefrom to the edge next the handle.

ISAAC SHOWALTER.

Witnesses:
W. W. DAVIS,
J. MORTON DAVIS.